(12) United States Patent
Bennett

(10) Patent No.: US 9,003,902 B1
(45) Date of Patent: Apr. 14, 2015

(54) DRIVE ASSEMBLY

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/290,645

(22) Filed: May 29, 2014

Related U.S. Application Data

(62) Division of application No. 12/853,978, filed on Aug. 10, 2010, now Pat. No. 8,739,905.

(60) Provisional application No. 61/232,616, filed on Aug. 10, 2009.

(51) Int. Cl.
  *B60K 17/28* (2006.01)
  *B60K 25/06* (2006.01)

(52) U.S. Cl.
  CPC ........... *B60K 25/06* (2013.01); *B60K 2025/065* (2013.01)

(58) Field of Classification Search
  USPC ............ 74/11, 15.4, 15.8, 333, 411.5, 665 H, 74/665 F, 730.1, 732.1; 180/53.1, 53.4, 180/53.7, 53.8, 292, 364, 367, 369, 374, 180/376; 192/13 R, 18 R, 48.8, 49, 50; 475/23, 72, 74, 83, 198, 223
  See application file for complete search history.

(56) References Cited

U.S. PATENT DOCUMENTS 2,537,060 A * 1/1951 Keese ............................. 74/15.2
8,739,905 B1 * 6/2014 Bennett ........................ 180/53.1

* cited by examiner

*Primary Examiner* — Paul N Dickson
*Assistant Examiner* — Laura Freedman
(74) *Attorney, Agent, or Firm* — Neal, Gerber & Eisenberg LLP

(57) ABSTRACT

A drive apparatus driven by a prime mover and having a variable speed transmission disposed within a housing is disclosed. A power take off is driven by an output shaft of the prime mover and selectively drives a power take off output shaft. The variable speed transmission drives a transmission output shaft, which in turn drives a first clutch mechanism and a second clutch mechanism. A first drive axle is engaged to and selectively driven by the first clutch mechanism and a second drive axle is engaged to and selectively driven by the second clutch mechanism.

26 Claims, 12 Drawing Sheets

DRIVE ASSEMBLY

CROSS-REFERENCE

This application is a divisional of U.S. application Ser. No. 12/853,978 filed on Aug. 10, 2010, which claims the benefit of U.S. Provisional Patent Application No. 61/232,616 filed on Aug. 10, 2009. These prior applications are incorporated herein in their entirety.

BACKGROUND OF THE INVENTION

This invention relates to a drive assembly for use in driving, for example, a snow thrower including an auger.

SUMMARY OF THE INVENTION

An improved drive assembly is disclosed herein, including a variable speed transmission and a pair of clutch assembles to separately power a pair of drive axles, in combination with a power take off ("PTO") drive for powering, for example, an auger. The drive assembly provided herein thereby allows for a lighter and more compact unit.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
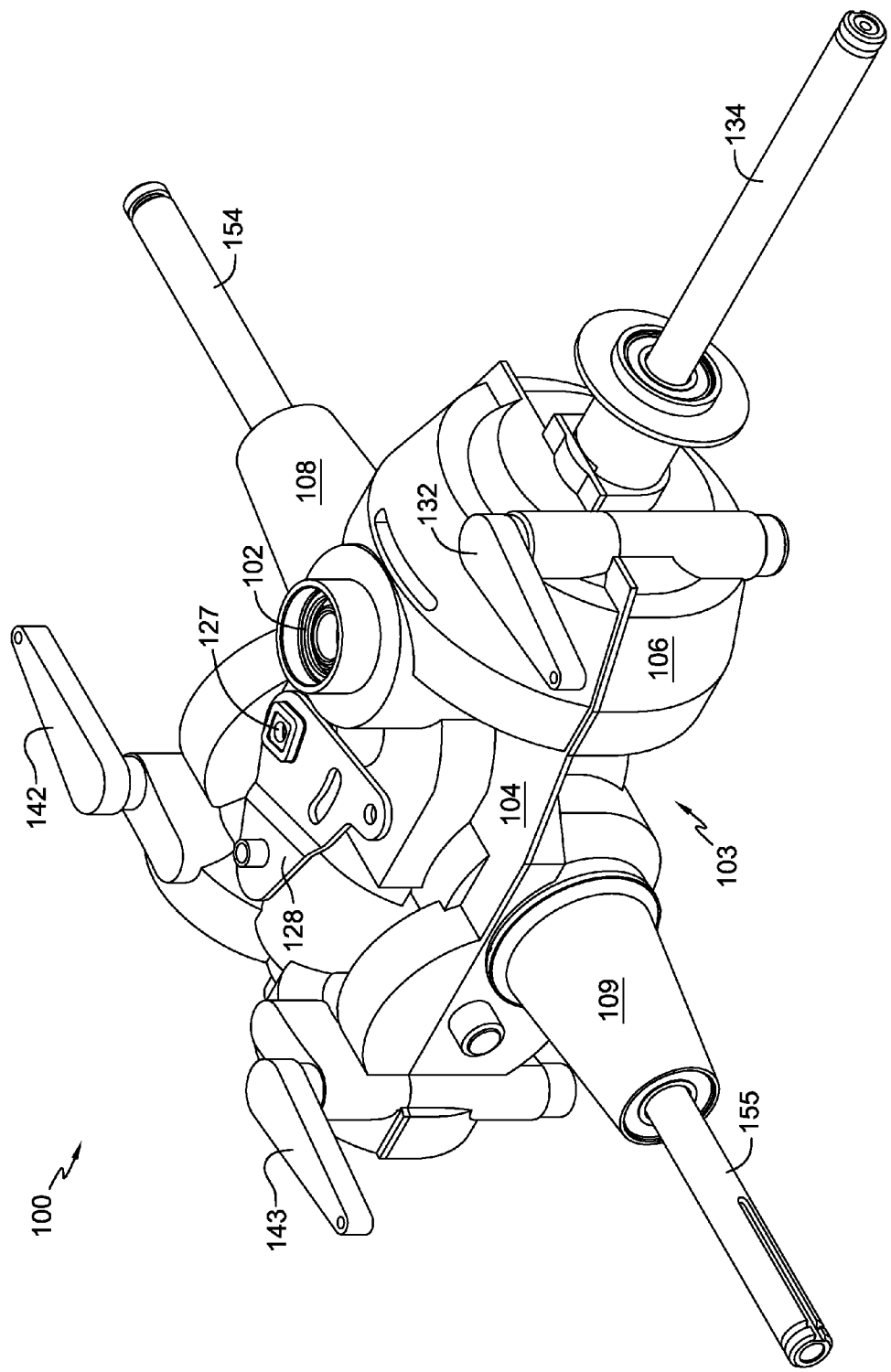
FIG. 1 is a perspective view of a drive assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Drive assembly 100 as shown in FIGS. 1-7 includes an external housing 103 comprising two housing elements 104, 106 joined along a split line that is generally parallel to the longitudinal axes of axle shafts 154 and 155, pump input shaft 116, motor shaft 136, and PTO output shaft 134. The details of drive assembly 100 are more clearly shown in FIG. 2, which is a top plan view of the unit with housing element 104 removed. The depicted embodiment shows a variable speed transmission in the form of a hydraulic transmission disposed in sump 110 formed in housing 103. However, it will be appreciated by those in the art that the scope of the present invention includes those embodiments in which the variable speed transmission comprises other types, including but not limited to toroidal, friction and gear drives.

Drive assembly 100 is configured to directly receive a vertical output shaft (not shown) from a prime mover (not shown), such as an internal combustion engine, electric motor or the like. The vertical output shaft (not shown) engages and drives an input shaft 112. As depicted, for example, in FIG. 6, input shaft 112 is integrally formed with bevel gear 112a of drive assembly 100. However, bevel gear 112a could optionally be separately formed from input shaft 112. Input shaft 112 passes through input shaft bearing 102 and is drivingly engaged by means of bevel gear 112a to bevel gear 114 mounted on pump input shaft 116, which drives a pump cylinder block 122 at a first end and provides rotational input to a clutch/brake assembly 130 at a second end.

Figure 10:
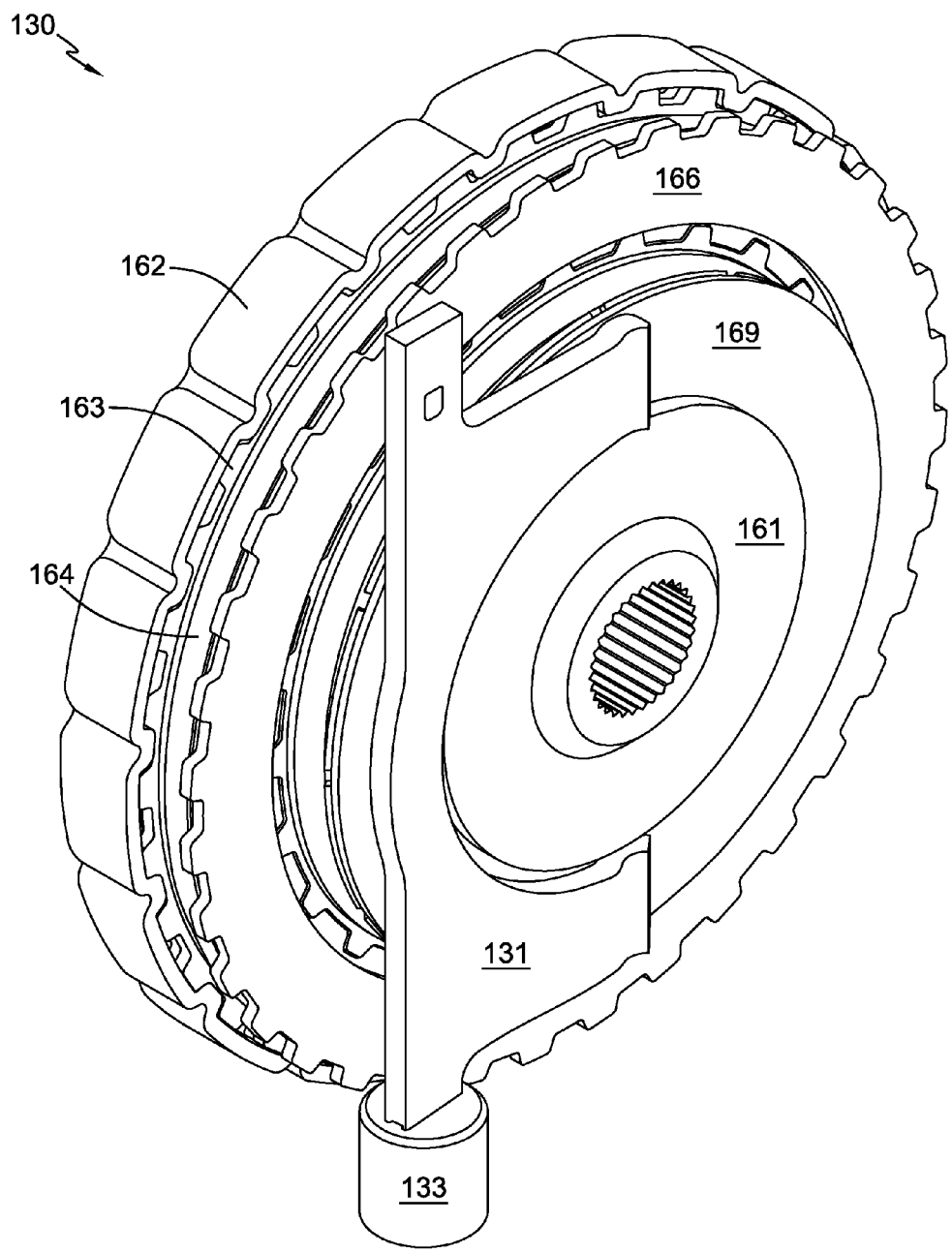
FIG. 10 is a perspective view of the PTO clutch/brake assembly shown in FIG. 2.
Figure 11:
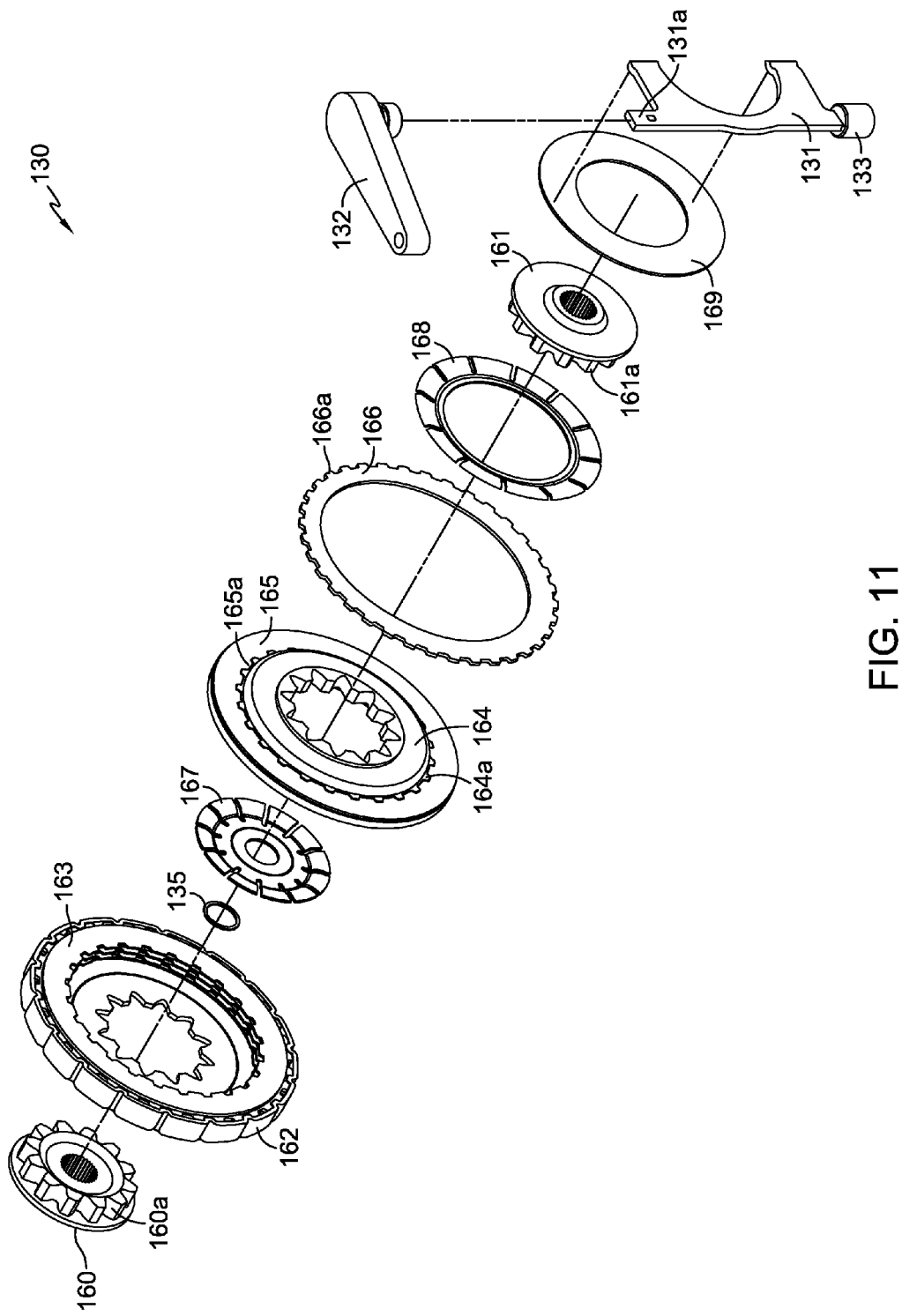
FIG. 11 is an exploded view of the PTO clutch/brake assembly shown in FIG. 10.

Clutch/brake assembly 130 regulates operation of a PTO apparatus. PTO output shaft 134 is supported by bearings 118 in housing 103 and engages the clutch and brake mechanisms of clutch/brake assembly 130 by means of output hub 161, which is fixed on PTO output shaft 134. Clutch/brake assembly 130 is shown in greater detail in FIGS. 10 and 11 as a wet mechanical clutch having clutch actuation fork 131 with projection 131a to engage PTO actuation arm 132. A similar projection (not shown) at the opposite end of clutch actuation fork 131 engages a pivot end 133, which is rotationally supported by a pocket (not shown) in housing element 106.

The depicted clutch/brake assembly 130 is designed so that the PTO output shaft 134 is normally biased to a braked state until actuation arm 132 is rotated. Brake stator 166 has teeth 166a formed on its outer periphery that mate with corresponding indentations or projections in housing 103 (not shown). This mating prevents rotation of brake stator 166 with respect to housing 103.

Brake rotor 165 is disposed on carrier 164 and has teeth 165a on its inner periphery that mate with corresponding teeth 164a on carrier 164. Brake bias spring 167, which is retained in position by retaining ring 135, bears upon carrier 164 and serves to bias the brake rotor 165 toward frictional engagement with brake stator 166. In this manner, clutch/brake assembly 130 is biased to the braked state. Carrier 164 is mated to output hub 161 via gear form 161a, and as stated above, output hub 161 is fixed on PTO output shaft 134. Because the frictional engagement with brake stator 166 arrests rotation of carrier 164, any rotation of output hub 161, as well as PTO output shaft 134, is also arrested.

When PTO actuation arm 132 is rotated, clutch actuation fork 131 contacts and bears upon washer 169. Washer 169 in turn contacts clutch spring 168 and bears upon it. Clutch spring 168 acts to ensure that excessive force or pressure is not applied to clutch plate stack 163 by carrier 164, thereby extending the service life of the wet clutch plates. In moderating the force applied by clutch actuation fork 131, clutch spring 168 acts on carrier 164, which moves against and overcomes the bias force of brake bias spring 167 and bears upon clutch plate stack 163. By this action, PTO output shaft 134 becomes disengaged from brake stator 166, and the driving engagement of PTO output shaft 134 and cage 162 is initiated.

Clutch input hub 160 is fixed to pump input shaft 116, and is also mated to cage 162 through gear form 160a. It will be appreciated by those in the art that the mating surfaces of cage 162 and clutch input hub 160 described here as a "gear form" may take other forms such as a tooth or spline form. As such, whenever the prime mover (not shown) is supplying power to drive assembly 100, cage 162 is driven by the rotation of pump input shaft 116. Clutch plate stack 163, which is disposed within cage 162, comprises two types of clutch plates. The first type comprises a plurality of teeth forms extending from the interior periphery of the clutch plate and are engaged to carrier 164. The second type comprises a plurality of teeth forms extending from the exterior periphery of the clutch plate and are engaged to and driven by cage 162. The first type of clutch plates are alternately disposed between the second type of clutch plates. When clutch actuation fork 131 rotates, the movement of carrier 164 under the influence of clutch actuation fork 131 brings the first type of clutch plates into frictional engagement with the second type of clutch plates, which causes the first type of clutch plates to rotate with cage 162 through the second type of clutch plates, transferring rotation and torque from cage 162 to PTO output shaft 134. Clutches of other design, e.g. other mechanical clutches, electrical clutches, or hydraulic clutches (not shown), may alternatively be used.

PTO output shaft 134 can be used to drive an implement such as a snow thrower auger (not shown) and blower (not shown). The layout of the present design permits PTO output shaft 134 to be collinear with pump input shaft 116 and motor output shaft 136, thereby permitting a particularly low profile unit. The mounting of clutch/brake assembly 130 and PTO output shaft 134 in a common housing 103 with the drive elements of drive assembly 100 also minimizes the overall size of the unit.

The drive portion of drive assembly 100 comprises a variable speed transmission which, in the depicted embodiment, is a hydrostatic transmission. A transaxle incorporating a hydrostatic transmission and design used in a snow thrower is shown in commonly-owned U.S. Pat. No. 6,651,529, the terms of which are incorporated herein by reference.

In the depicted embodiment, center section 120 is disposed in housing 103. Pump cylinder block 122 and motor cylinder block 124 are disposed on center section 120 and are hydraulically connected to one another through porting formed in center section 120. As noted, pump input shaft 116 is engaged to and driven by bevel gear 114, and pump input shaft 116 is engaged to and drives pump cylinder block 122. Pump input shaft 116 is supported by center section 120 at one end and by bearing 119 proximate to its other end. Pump cylinder block 122, motor cylinder block 124 and their accompanying pistons can be of a standard design for an axial piston hydrostatic transmission, as is shown in commonly-owned U.S. Pat. No. 6,651,529. A rotatable swash plate 126 controlled by integrally formed trunnion 127 and external control arm 128 operate to control the output of the hydrostatic transmission as is known in the art.

Figure 8:
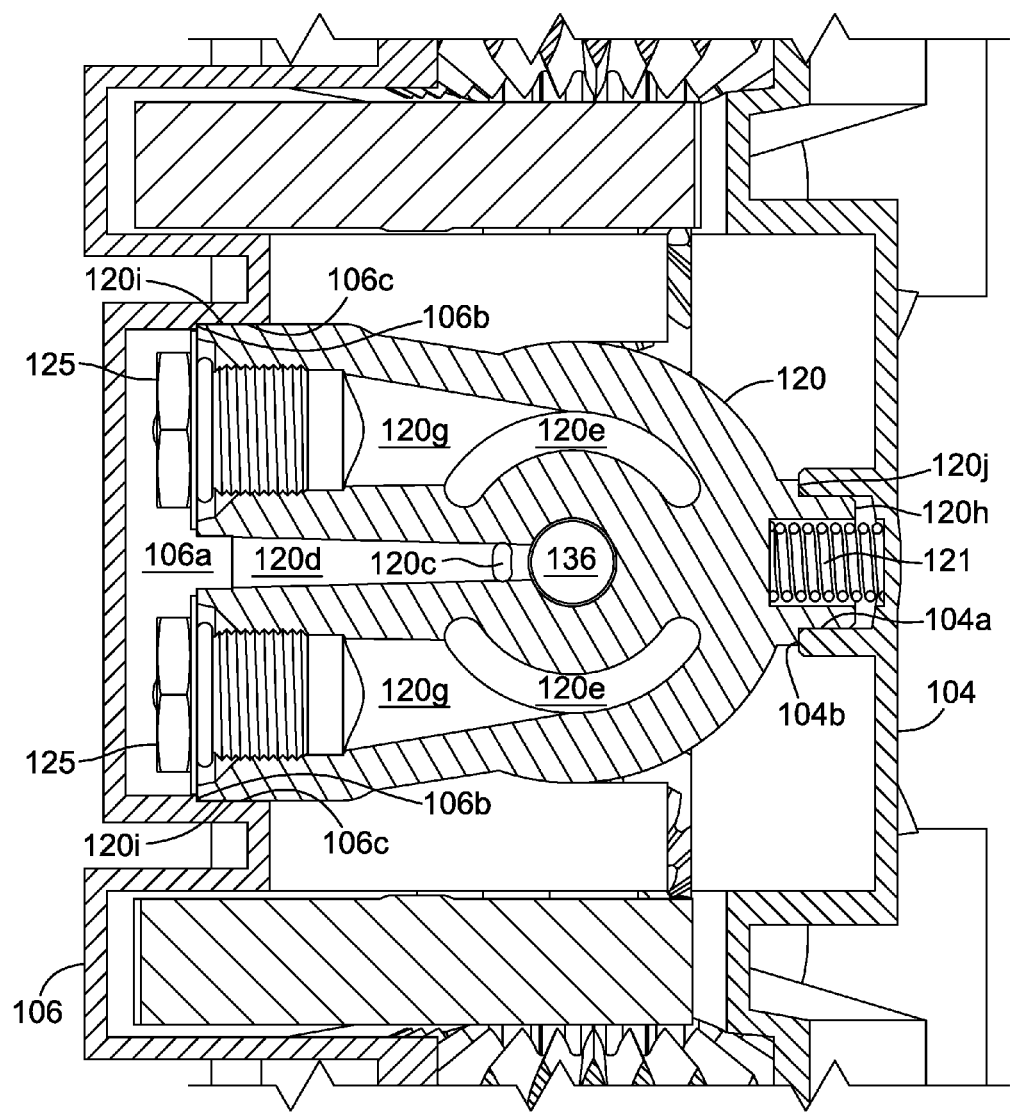
FIG. 8 is a cross-sectional view of the drive assembly along the line 8-8 in FIG. 7.
Figure 9:
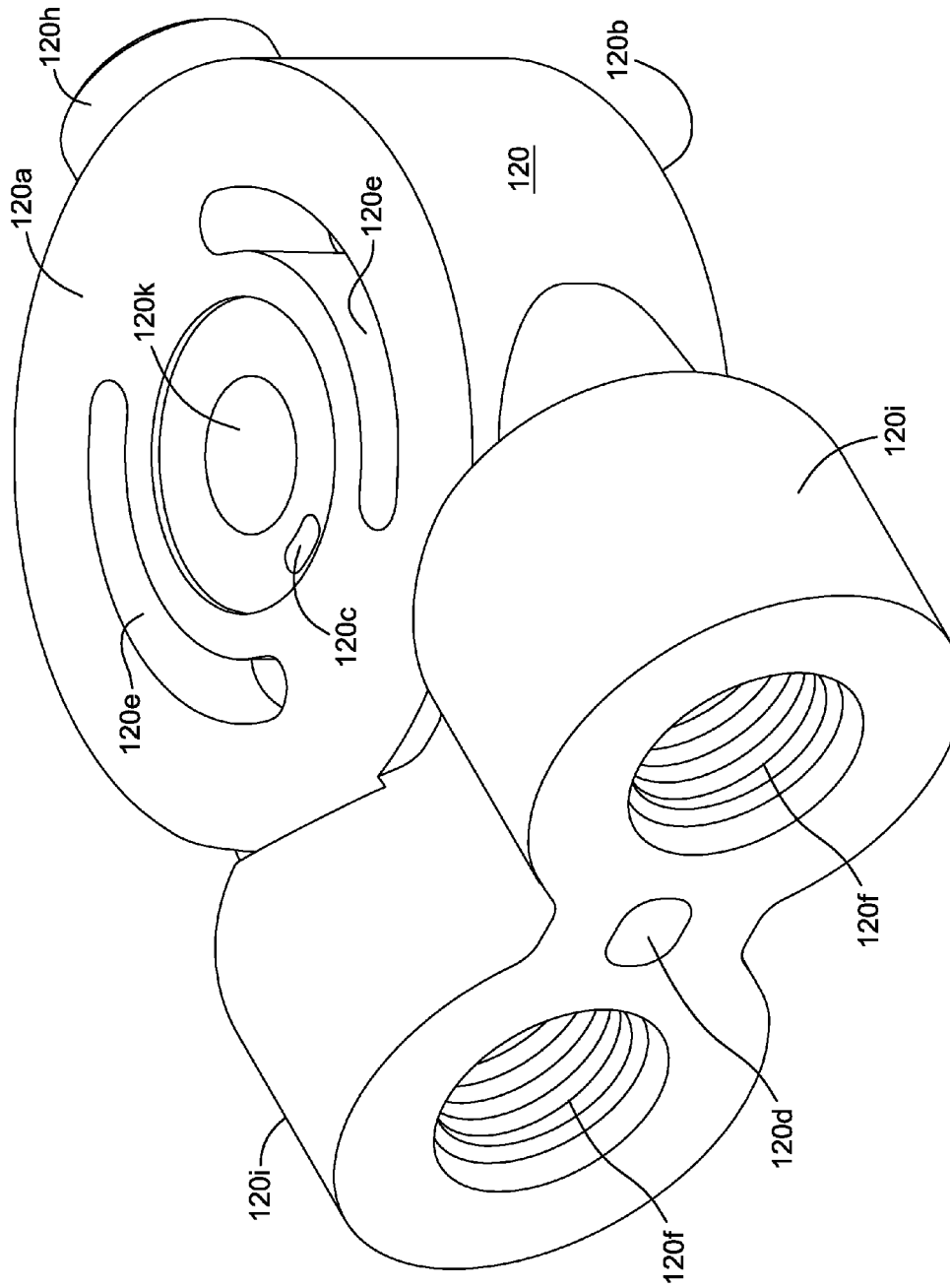
FIG. 9 is a perspective view of the center section of the drive assembly of FIG. 1.

Center section 120 is shown in greater detail in FIGS. 8 and 9. Center section 120 has pump running surface 120a on which pump cylinder block 122 is disposed. Kidney through-ports 120e permit passage of hydraulic fluid through center section 120 to motor running surface 120b and motor cylinder block 124 disposed thereon to complete a hydraulic circuit. Block drain 120c allows passage of hydraulic fluid into common block drain and shafts lubrication passage 120d, simultaneously preventing block lift of the pump cylinder block 122 and motor cylinder block 124, while providing additional lubrication to pump input shaft 116 and motor output shaft 136. Check plugs 125 are disposed in check plug ports 120f to regulate flow through check plug passages 120g. Shaft-support opening 120k, which serves as a bearing surface, extends through center section 120 to receive both pump input shaft 116 and motor output shaft 136.

Center section 120, which does not use fasteners to secure its position in housing 103, has several features which maintain its proper positioning. These features are located in both housing elements 104 and 106, and work in concert to trap center section 120 between them. During assembly of drive assembly 100, center section 120 is inserted into pocket 106a formed in housing 106 and abuts locator stops 106b. In proximity to check plug passages 120f are alignment profiles 120i, which interface with mating alignment profiles 106c formed in pocket 106a to locate and restrain center section 120. On the opposing end of center section 120 is located protrusion 120h, which is inserted into pocket 104a of housing 104 to further locate and restrain center section 120. Locator stop 120j, formed adjacent to protrusion 120h, abuts against outer abutment surface 104b of pocket 104a to further locate and restrain center section 120. Protrusion 120h prevents rotation of center-section 120 that would be caused by rotational forces imparted by the rotation of pump input shaft 116 and motor output shaft 136 because of their contact with center section 120. Vibration dampening spring 121, which is optional, bears on center section 120 and can be included to dampen any vibration caused by operation of drive assembly 100.

Figure 2:
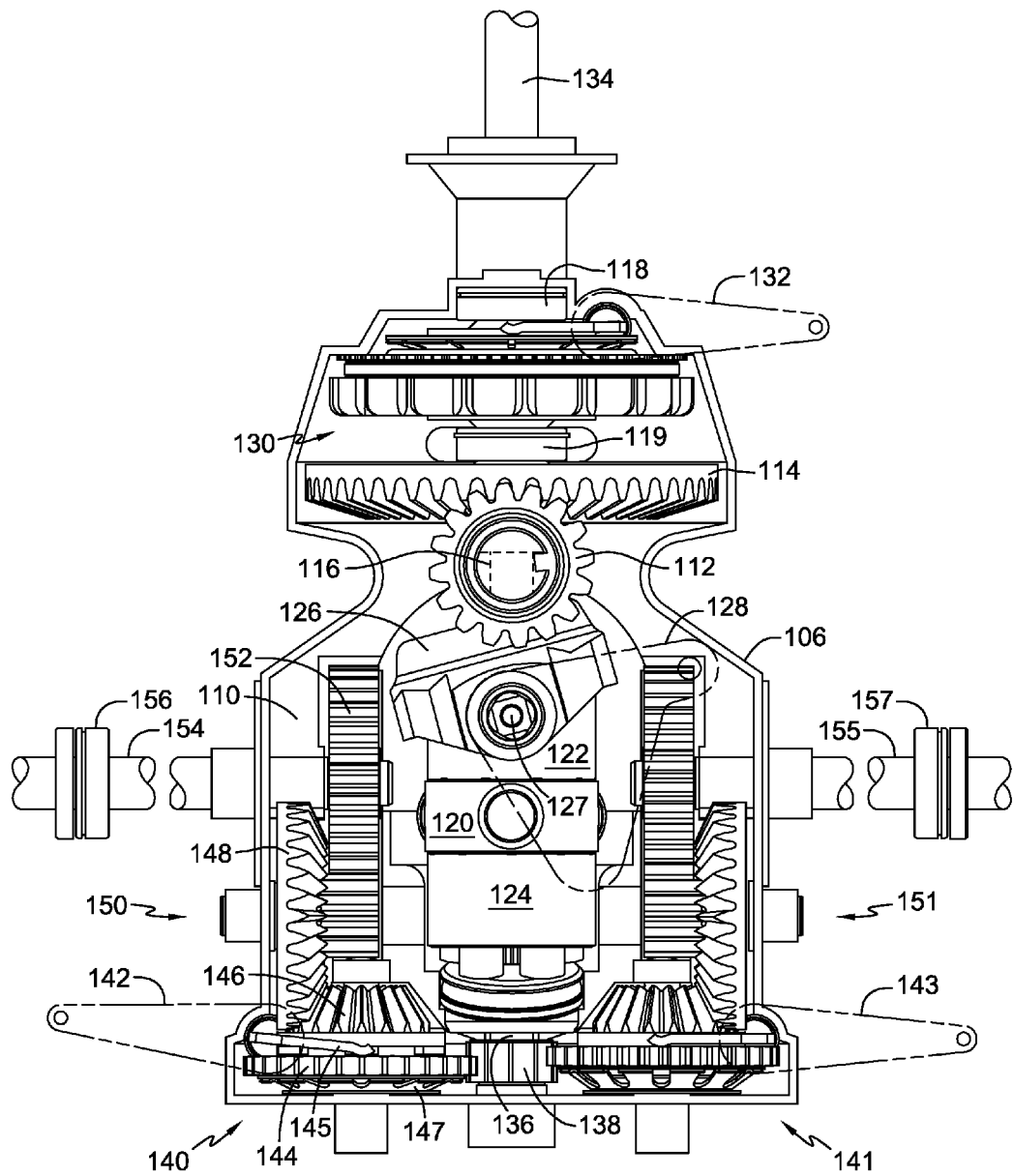
FIG. 2 is a top plan view of the drive assembly of FIG. 1, with one housing element removed.
Figure 3:
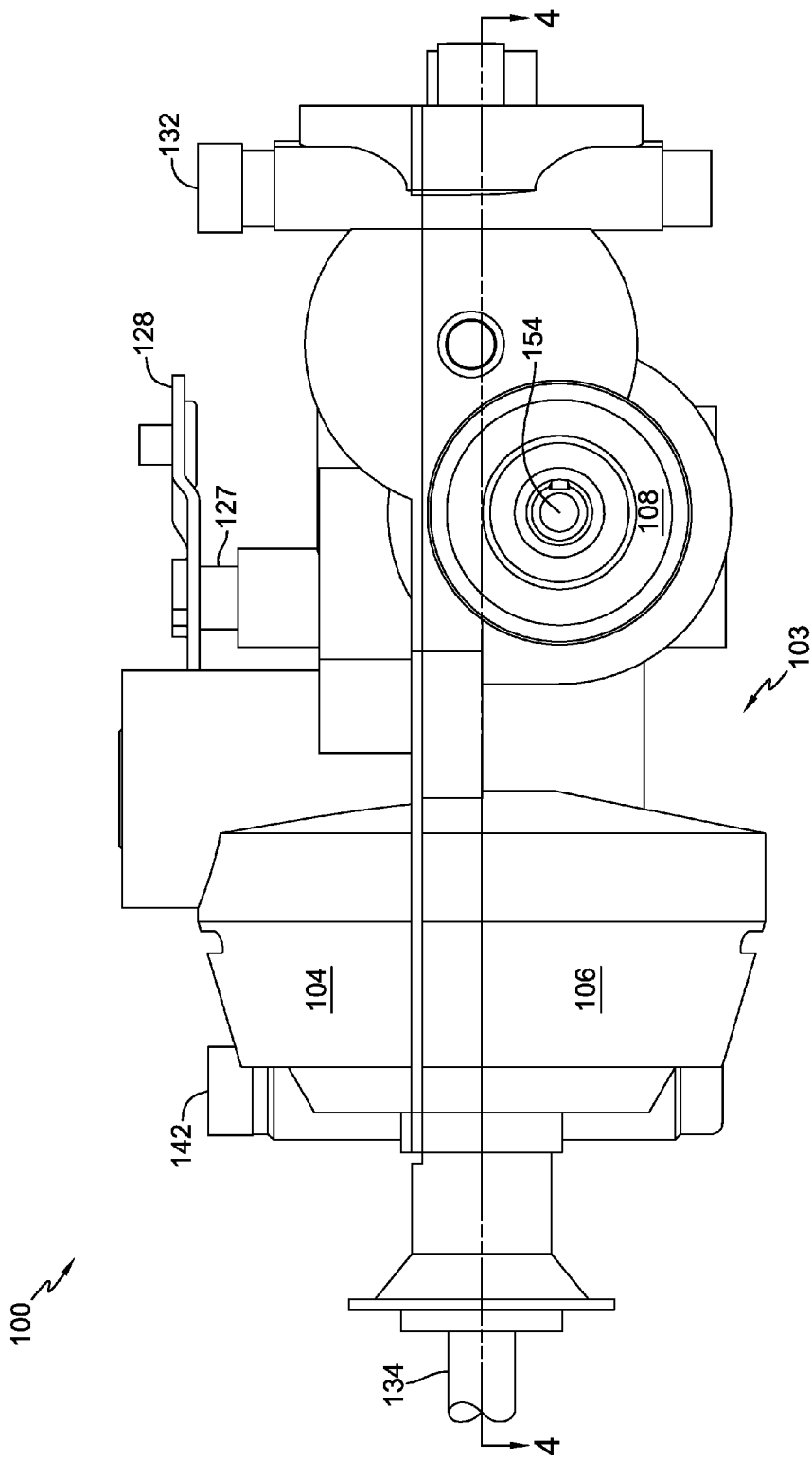
FIG. 3 is a side elevational view of the drive assembly of FIG. 1.
Figure 4:
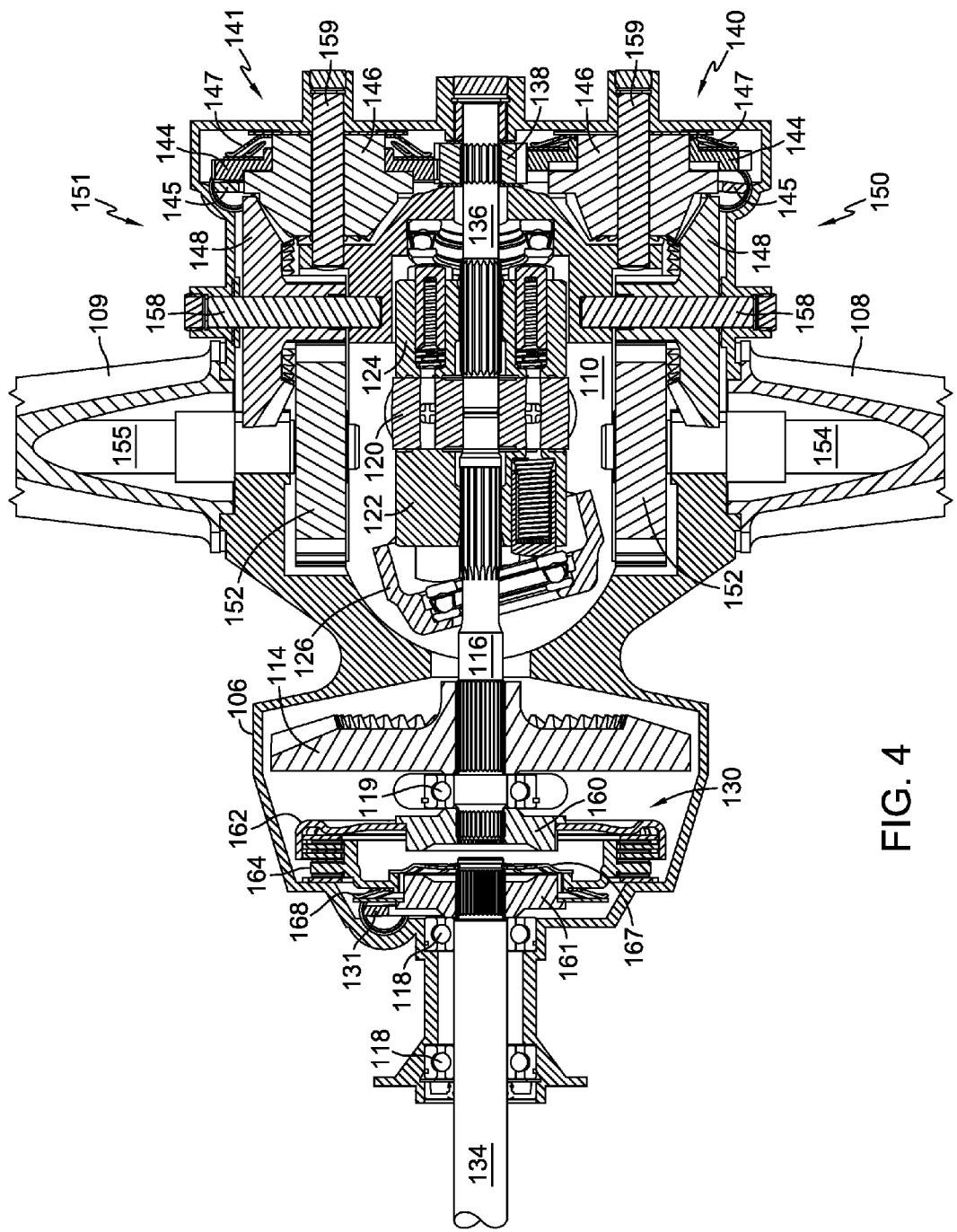
FIG. 4 is a cross-sectional view of the drive assembly along the line 4-4 in FIG. 3.
Figure 5:
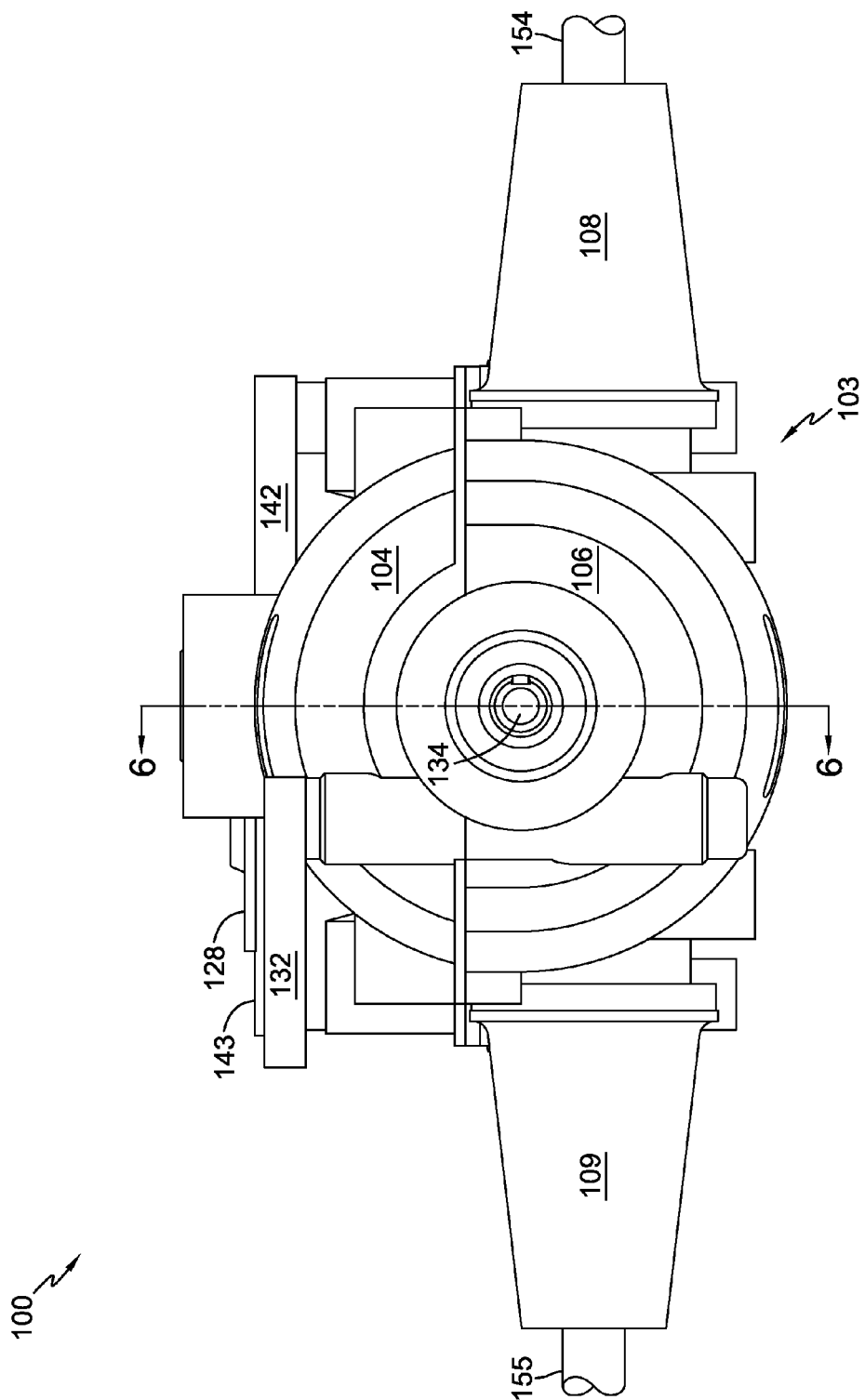
FIG. 5 is a front elevational view of the drive assembly of FIG. 1.
Figure 6:
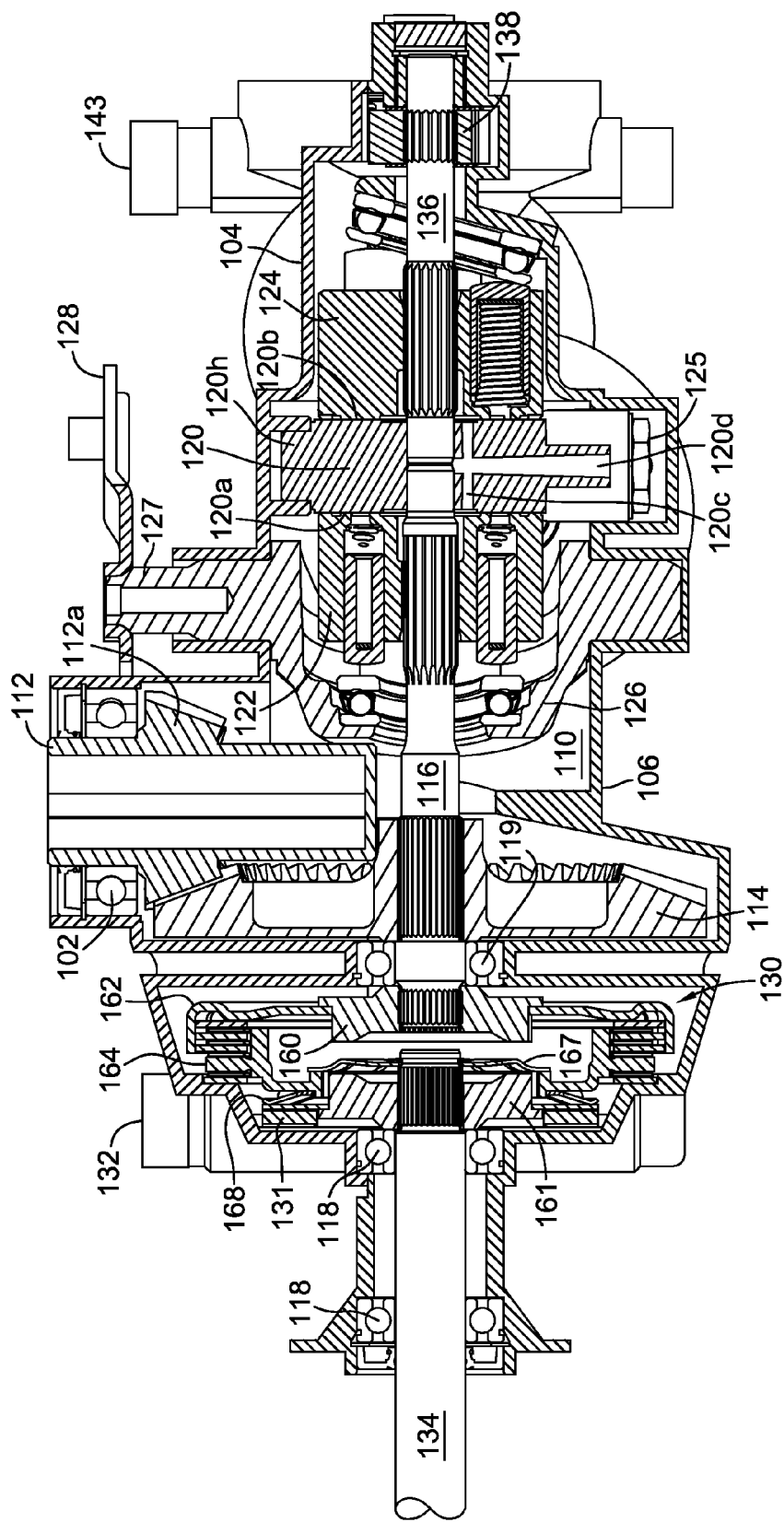
FIG. 6 is a cross-sectional view of the drive assembly along the line 6-6 in FIG. 5.

As illustrated in FIGS. 2, 4 and 6, motor cylinder block 124 is engaged to and drives motor output shaft 136. Motor output shaft 136 is supported by center section 120 and by a bearing in housing 106. A pinion spur gear 138 is disposed on motor output shaft 136 and is engaged to and drives a pair of input spur gears 144 which are part of the clutch assembles 140 and 141. This gear combination may serve as a first reduction stage, depending on the scaling of the respective gears for a given application.

For the sake of simplicity, only the left side clutch assembly 140, gear train 150 and axle 154 will be described in detail herein. The right side clutch assembly 141, including gear train 151 and axle 155, can be substantially identical in form and function.

Gear train 150 comprises spur and bevel combination gear 148 engaged to and driving spur gear 152, which is fixed to axle shaft 154. This gear combination may serve as a final reduction stage. When the clutch assembly 140 is engaged, output bevel gear 146 drives spur and bevel combination gear 148, providing a gear reduction. Gear 148 in turn is engaged to and drives a spur gear 152 fixed to axle shaft 154. Jack shafts 158 and 159, which rotationally support spur and bevel combination gear 148 and output bevel gear 146 respectively, are inserted into housing element 106 through various plugged openings visible in FIGS. 1 and 4 to facilitate assembly.

Figure 7:
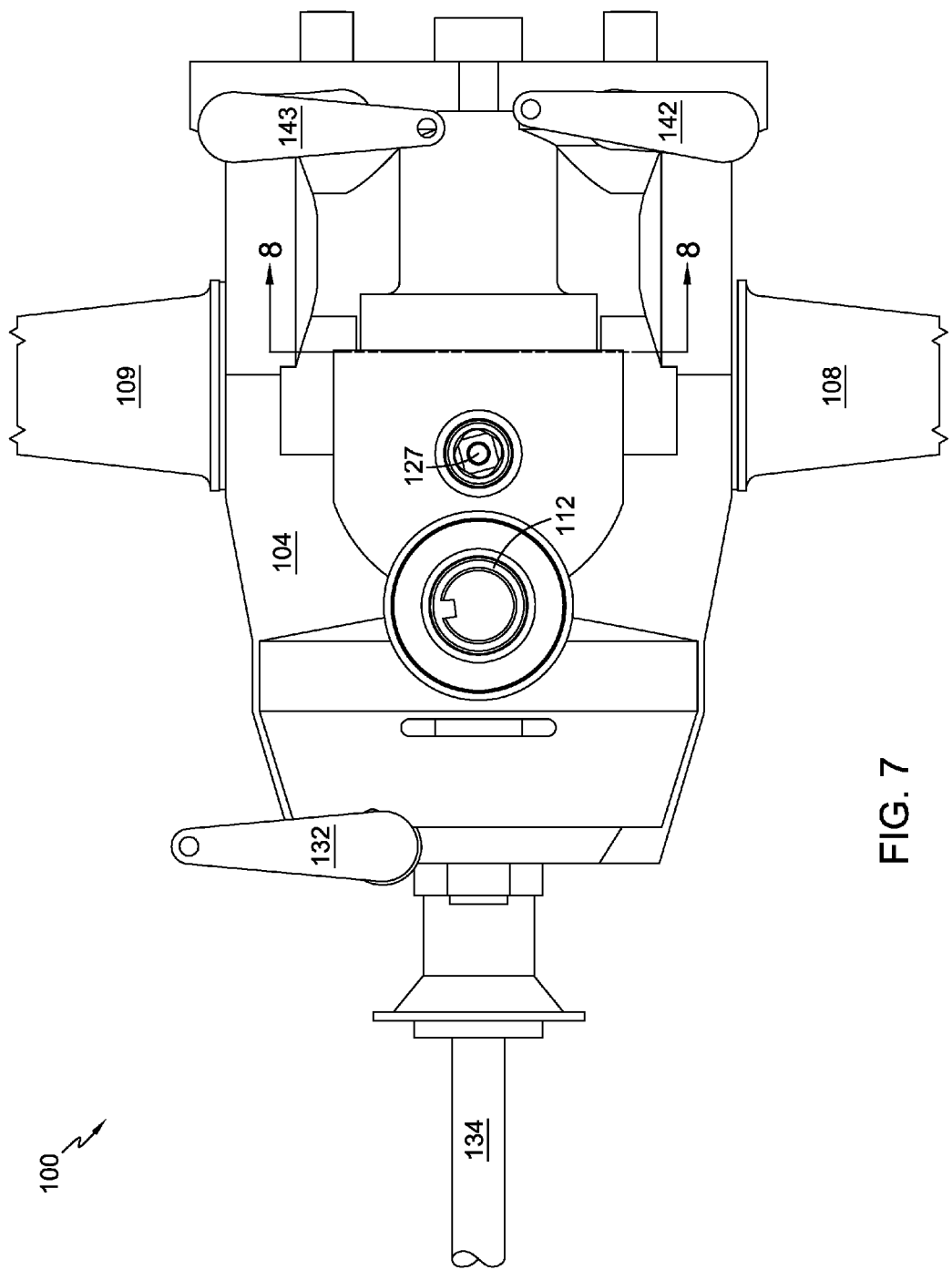
FIG. 7 is a top plan view of the drive assembly of FIG. 1.
Figure 12:
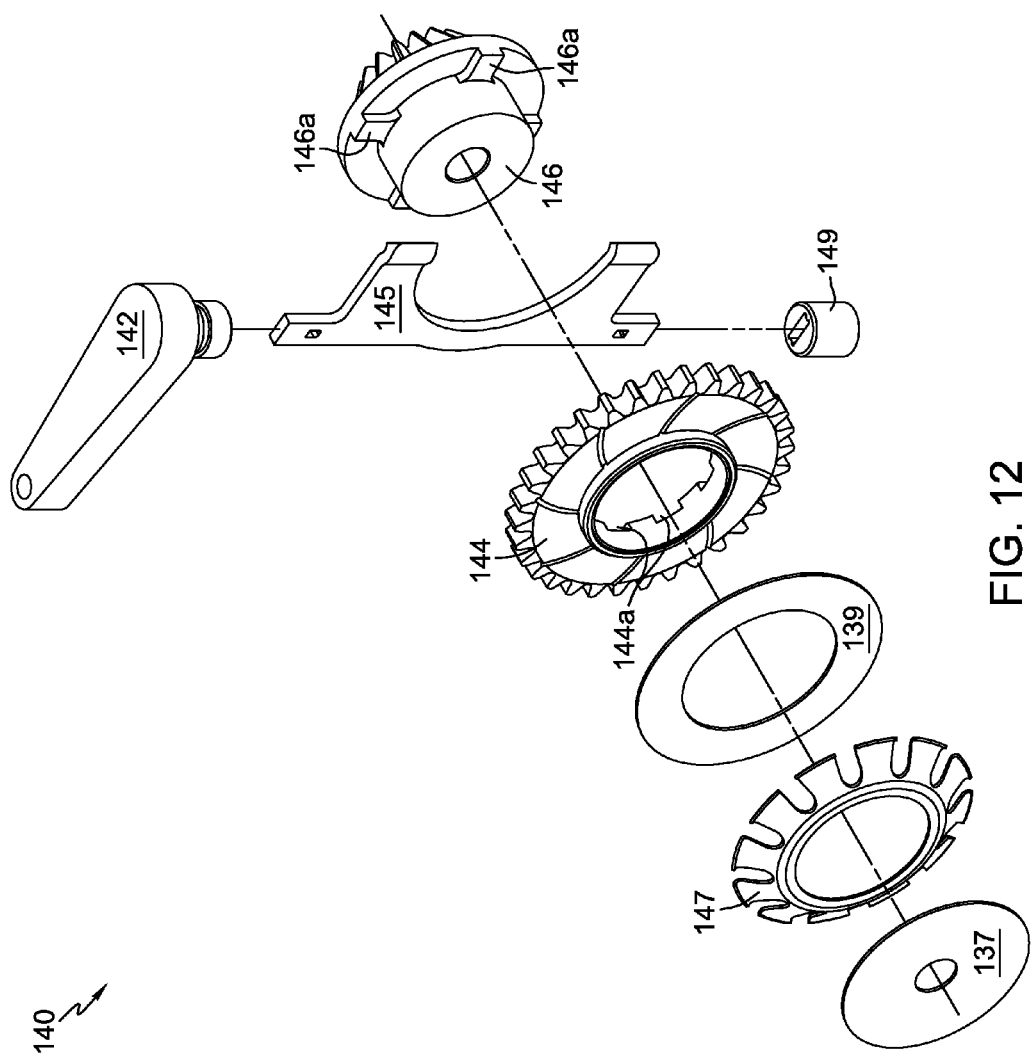
FIG. 12 is an exploded view of one of the clutch assemblies that transfers power from the transmission to the gear train of the drive assembly.

Unlike the PTO clutch/brake assembly 130 previously detailed, clutch assembly 140 is normally biased to an engaged state. Clutch assembly 140, however, is depicted in a disengaged state in FIGS. 2 and 4 via rotation of clutch actuation arm 142. It should be noted in these same figures that clutch assembly 141 is depicted in an engaged state. Clutch actuation arm 142 may be connected to an actuator fork 145 in various orientations as required by the application. A comparison of the relative positions of clutch actuation arm 142 in FIGS. 2 and 7 illustrates this principle. As previously noted with clutch actuation fork 131, the opposite end of clutch actuator fork 145 engages a pivot end 149, which is rotationally supported by a pocket (not shown) in housing element 106. Upon rotation of clutch actuation arm 142, actuator fork 145 pushes input spur gear 144 against washer 139 and disc spring 147 to compress the spring. A thrust washer 137 resides on the opposite side of disc spring 147 to protect the components of clutch assembly 140 and housing element 106. This movement of input spur gear 144 away from output bevel gear 146 disengages projections 146a (as best shown in FIG. 12) on the backside of output bevel gear 146 from corresponding indentations 144a in the face of the input spur gear 144 that contacts actuator fork 145, effectively disengaging gear train 150 from motor output shaft 136. In an application such as a snow thrower, clutch actuation arms 142 and 143 can be engaged to linkages (not shown) to permit the user to separately and selectively control the input to the two axles 154, 155 of drive assembly 100, thereby driving and steering the application.

Axle shaft 154 is supported in axle bearing 156 disposed external to housing 103 and on a separate bearing in housing 103, so that an internal end of axle shaft 154 is disposed adjacent to the hydrostatic transmission. Similarly, an internal end of axle shaft 155 is disposed adjacent to an opposite side of the hydrostatic transmission, thereby reducing the overall size of the unit. An external end of axle shaft 154 extends from axle horn 108.

It will be understood that various internal bearings, seals, fasteners and related hardware are not depicted in the figures or are depicted but not described herein, but the operation and applicability of such hardware is known to a person of skill in the art. Furthermore, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus, comprising:
   a power take off disposed in a housing and driving a power take off output shaft;
   a hydraulic transmission disposed in the housing and comprising a pump engaged to and driven by a pump input shaft and a motor engaged to and driving a motor shaft, wherein both the pump and the motor are disposed on and hydraulically connected through a center section;
   a first output clutch mechanism driven by the motor shaft and drivingly engaged to a first output axle, wherein the first output axle has a first end disposed external to the housing and a second end disposed internal to the housing, the second end of the first output axle being adjacent to a first side of the hydraulic transmission; and
   a second output clutch mechanism driven by the hydraulic transmission and drivingly engaged to a second output axle, wherein the second output axle has a first end disposed external to the housing and a second end disposed internal to the housing, the second end of the second output axle being adjacent to a second side of the hydraulic transmission opposite to the first side thereof.

2. The drive apparatus of claim 1, wherein the first output axle and the second output axle are both perpendicular to the power take off output shaft.

3. The drive apparatus of claim 1, wherein the power take off output shaft is coaxial with the pump input shaft.

4. The drive apparatus of claim 1, wherein the pump input shaft and the motor shaft are coaxial.

5. The drive apparatus of claim 4, wherein the power take off output shaft is coaxial with the pump input shaft and the motor shaft.

6. The drive apparatus of claim 1, wherein the power take off and the pump are driven by a common input shaft that extends into the housing perpendicular to both the power take off output shaft and the pump input shaft.

7. The drive apparatus of claim 1, further comprising a first output gear disposed on a first jack shaft and a second output gear disposed on a second jack shaft, wherein the first output gear and the second output gear are both driven by the motor shaft.

8. The drive apparatus of claim 7, wherein the first jack shaft and the second jack shaft are both parallel to the motor shaft.

9. The drive apparatus of claim 7, further comprising a first input spur gear driven by the motor shaft and selectively engaged to the first output gear, and a second input spur gear driven by the motor shaft and selectively engaged to the second output gear.

10. The drive apparatus of claim 7, further comprising a first intermediate gear disposed on a third jack shaft and driven by the first output gear, and a second intermediate gear disposed on a fourth jack shaft and driven by the second output gear.

11. The drive apparatus of claim 10, wherein the first jack shaft and the second jack shaft are both parallel to the motor shaft and the third jack shaft and the fourth jack shaft are perpendicular to the motor shaft.

12. The drive apparatus of claim 10, further comprising a first spur gear engaged to and driven by the first intermediate gear, the first spur gear being disposed on and driving the first output axle, and a second spur gear engaged to and driven by the second intermediate gear, the second spur gear being disposed on and driving the second output axle.

13. The drive apparatus of claim 12, wherein the first spur gear is disposed adjacent the first side of the hydraulic transmission and the second spur gear is disposed adjacent the second side of the hydraulic transmission.

14. A drive apparatus, comprising:
   a power take off disposed in a housing and driving a power take off output shaft;
   a variable speed transmission disposed in the housing and driving a motor shaft, wherein the power take off and the variable speed transmission are driven by a common input shaft that extends into the housing perpendicular to the power take off output shaft;

a first output clutch mechanism driven by the motor shaft and drivingly engaged to a first output axle, wherein the first output axle has a first end disposed external to the housing and a second end disposed internal to the housing, the second end of the first output axle being adjacent to a first side of the variable speed transmission; and a second output clutch mechanism driven by the variable speed transmission and drivingly engaged to a second output axle, wherein the second output axle has a first end disposed external to the housing and a second end disposed internal to the housing, the second end of the second output axle being adjacent to a second side of the variable speed transmission opposite to the first side thereof.

15. The drive apparatus of claim 14, wherein the first output axle and the second output axle are both perpendicular to the power take off output shaft.

16. The drive apparatus of claim 14, wherein the power take off further comprises a clutch/brake mechanism engaged to the power take off output shaft, and the clutch/brake mechanism comprises a braked state, wherein the power take off output shaft is prevented from rotating, and a driving state, wherein the power take off output shaft is rotated.

17. The drive apparatus of claim 16, wherein the clutch/brake mechanism comprises a wet mechanical clutch and a first spring that biases the clutch/brake mechanism to the braked state.

18. A drive apparatus for selectively driving a first axle shaft and a second axle shaft, the drive apparatus comprising:

a first clutch assembly engaged to and selectively driving the first axle shaft, and a second clutch assembly engaged to and selectively driving the second axle shaft, wherein each clutch assembly separately comprises:

a first jack shaft;

an output bevel gear disposed on the first jack shaft and comprising a first side and a second side formed opposite the first side;

an input spur gear comprising a first side and a second side formed opposite the first side, wherein the input spur gear is disposed on the first jack shaft and axially movable between a first position, in which the input spur gear is engaged to the output bevel gear, and at least a second position, in which the input spur gear is not engaged to the output bevel gear;

an actuator fork rotatably disposed between the output bevel gear and the input spur gear; and a spring engaged to the input spur gear, wherein the spring biases the input spur gear toward the first position.

19. The drive apparatus of claim 18, wherein, in both the first clutch assembly and the second clutch assembly, the actuator fork engages the input spur gear when the actuator fork is rotated in a first direction, and the input spur gear is moved to the second position when the actuator fork is rotated in the first direction.

20. The drive apparatus of claim 18, wherein both the first clutch assembly and the second clutch assembly further comprise a plurality of projections formed on the first side of the output bevel gear, and a plurality of indentations formed on the first side of the input spur gear, wherein the plurality of projections engage the plurality of indentations when the input spur gear is in the first position.

21. The drive apparatus of claim 18, wherein the spring in both the first clutch assembly and the second clutch assembly comprises a disc spring disposed on the first jack shaft.

22. The drive apparatus of claim 21, wherein the first clutch assembly and the second clutch assembly each comprise an intermediate gear disposed on a second jack shaft and driven by the output bevel gear, wherein both of the first jack shafts are perpendicular to both of the second jack shafts; and the drive apparatus further comprising:

a first spur gear engaged to and driven by one of the intermediate gears, the first spur gear being disposed on and driving the first axle shaft; and a second spur gear engaged to and driven by the other of the intermediate gears, the second spur gear being disposed on and driving the second axle shaft.

23. The drive apparatus of claim 18, further comprising:

a hydraulic transmission driving both the first clutch assembly and the second clutch assembly, the hydraulic transmission comprising a pump engaged to and driven by a pump input shaft and a motor engaged to and driving a motor shaft, wherein both the pump and the motor are disposed on and hydraulically connected through a center section; and a power take off driving a power take off output shaft that is coaxial with the pump input shaft and perpendicular to the first axle shaft and the second axle shaft.

24. The drive apparatus of claim 23, wherein the first clutch assembly and the second clutch assembly each comprise an intermediate gear disposed on a second jack shaft and driven by the output bevel gear.

25. The drive apparatus of claim 24, wherein both of the first jack shafts are parallel to the motor shaft and both of the second jack shafts are perpendicular to the motor shaft.

26. The drive apparatus of claim 25, further comprising a first spur gear engaged to and driven by one of the intermediate gears, the first spur gear being disposed on and driving the first axle shaft, and a second spur gear engaged to and driven by the other of the intermediate gears, the second spur gear being disposed on and driving the second axle shaft.

* * * * *